(12) United States Patent
Takizawa et al.

(10) Patent No.: US 10,641,028 B2
(45) Date of Patent: May 5, 2020

(54) ACTUATOR AND VEHICLE DOOR OPENING AND CLOSING ACTUATOR

(71) Applicant: MITSUBA Corporation, Gunma (JP)

(72) Inventors: Takashi Takizawa, Gunma (JP); Masamori Mochizuki, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/348,866

(22) PCT Filed: Nov. 8, 2017

(86) PCT No.: PCT/JP2017/040249
§ 371 (c)(1),
(2) Date: May 9, 2019

(87) PCT Pub. No.: WO2018/088430
PCT Pub. Date: May 17, 2018

(65) Prior Publication Data
US 2019/0277076 A1    Sep. 12, 2019

(30) Foreign Application Priority Data
Nov. 14, 2016   (JP) ................................. 2016-221481

(51) Int. Cl.
*F16H 25/20*        (2006.01)
*B60J 5/10*         (2006.01)
(Continued)

(52) U.S. Cl.
CPC ............... *E05F 15/622* (2015.01); *B60J 5/10* (2013.01); *B60J 5/101* (2013.01);
(Continued)

(58) Field of Classification Search
CPC .... E05F 15/622; F16H 25/20; F16H 25/2031; F16H 25/2075; E05Y 2900/546; E05Y 2800/12; E05Y 2800/428
See application file for complete search history.

(56) References Cited

U.S. PATENT DOCUMENTS

2014/0137477 A1* 5/2014 Ooe ...................... E05F 1/1091
                                                    49/358
2017/0081895 A1* 3/2017 Osafune ..................... B60J 5/10
(Continued)

FOREIGN PATENT DOCUMENTS

JP    2014100956     6/2014
JP    2015161157     9/2015
(Continued)

OTHER PUBLICATIONS

"International Search Report (Form PCT/ISA/210) of PCT/JP2017/040249," dated Feb. 6 2018 with English translation thereof, pp. 1-4.

Primary Examiner — Luis A Gonzalez
(74) Attorney, Agent, or Firm — JCIPRNET

(57) ABSTRACT

The present invention is provided with: a first housing; a second housing; a guide tube; a third housing; a motor part that is incorporated in the first housing; a screw shaft that is driven to rotate upon reception of the rotational force of a shaft of the motor part and applies power to the third housing; a bearing holder that is provided in the first housing; an inner flange that is provided in the second housing; an outer flange that is provided in the guide tube and that is arranged at a position where the outer flange overlaps the inner flange in an axial direction; a seal that is sandwiched between the inner and the outer flanges; and a coil spring (47) that is provided between the second housing (Continued)

(7) and the guide tube (48) and presses the inner flange (46) toward the outer flange (49) side.

12 Claims, 5 Drawing Sheets

(51) Int. Cl.
| | |
|---|---|
| *E05F 15/622* | (2015.01) |
| *F16J 15/10* | (2006.01) |
| *H02K 5/10* | (2006.01) |
| *H02K 5/173* | (2006.01) |
| *H02K 7/06* | (2006.01) |
| *H02K 7/08* | (2006.01) |
| *H02K 7/116* | (2006.01) |
| *H02K 7/114* | (2006.01) |
| *H02K 7/14* | (2006.01) |

(52) U.S. Cl.
CPC .......... *F16H 25/2021* (2013.01); *F16J 15/10* (2013.01); *F16J 15/102* (2013.01); *H02K 5/10* (2013.01); *H02K 5/1735* (2013.01); *H02K 7/06* (2013.01); *H02K 7/085* (2013.01); *H02K 7/114* (2013.01); *H02K 7/116* (2013.01); *H02K 7/14* (2013.01); *E05Y 2900/546* (2013.01); *F16H 2025/2031* (2013.01)

(56) References Cited

U.S. PATENT DOCUMENTS

| | | | |
|---|---|---|---|
| 2017/0145727 A1* | 5/2017 | Yamagata | F16H 25/2454 |
| 2017/0275939 A1* | 9/2017 | Tsukagoshi | F16H 25/20 |
| 2018/0216390 A1* | 8/2018 | Takizawa | F16H 1/46 |
| 2018/0216391 A1* | 8/2018 | Takizawa | B60J 5/10 |

FOREIGN PATENT DOCUMENTS

| | | |
|---|---|---|
| JP | 2015218443 | 12/2015 |
| JP | 2016216973 | 12/2016 |
| JP | 2017032071 | 2/2017 |
| JP | 2017101537 | 6/2017 |
| JP | 2017172201 | 9/2017 |
| WO | 2017022503 | 2/2017 |
| WO | 2017022581 | 2/2017 |

* cited by examiner

ACTUATOR AND VEHICLE DOOR OPENING AND CLOSING ACTUATOR

CROSS-REFERENCE TO RELATED APPLICATION

This application is a 371 application of the International PCT application serial no. PCT/JP2017/040249, filed on Nov. 8, 2017, which claims the priority benefit of Japan Patent Application No. 2016-221481, filed on Nov. 14, 2016. The entirety of each of the abovementioned patent applications is hereby incorporated by reference herein and made a part of this specification.

TECHNICAL FIELD

The present invention relates to an actuator and a vehicle door opening and closing actuator.

BACKGROUND ART

Conventionally, in a vehicle door opening and closing device, there is known a configuration in which an actuator (a support member) that opens and closes a tailgate by expansion and contraction drive in an axial direction is provided between a periphery of an opening portion on a vehicle body side and the tailgate (a back door) provided in an openable and closable manner at the opening portion (see, for example, Patent Literature 1).

Such actuator includes a tubular first housing, a second housing which has a diameter larger than that of the first housing and into which the first housing is inserted, a motor provided in the first housing, a drive shaft (a screw spindle) which is connected to a rotation shaft of the motor via a reduction gear and is disposed coaxially with the rotation shaft, a spindle nut which is fixed to the second housing and is screwed to the drive shaft, a compression coil spring which is accommodated in the second housing and urges the first housing and the second housing in the expansion direction.

The motor and the reduction gear are provided in the first housing. Also, a bearing holder is provided at an end portion of the first housing on the second housing side. The bearing holder holds a bearing (a ball bearing), and rotatably supports an end portion of the drive shaft on the reduction gear side via the bearing. As a result, one end of the rotation shaft of the motor, the reduction gear, and one end of the drive shaft are supported by one bearing, thereby achieving miniaturization of the actuator.

RELATED ART LITERATURE

Patent Literature

Patent Literature 1: Japanese Patent Laid-Open No. 2014-100956

SUMMARY OF INVENTION

Technical Problem

However, in the conventional technology, rainwater or the like is likely to enter through a gap between the first housing and the second housing. This rainwater might reach the bearing holder (the bearing) along an inner circumferential surface of the first housing or the second housing to cause a problem in the bearing.

The present invention has been made in view of the above circumstances, and the present invention is to provide an actuator and a vehicle door opening and closing actuator which can prevent the intrusion of rainwater or the like into the inside, and in particular, can reliably prevent rainwater or the like from entering the bearing holder or the bearing.

Solution to Problem

According to the first aspect of the present invention, an actuator includes a first housing that is tubular, a second housing that is tubular and fitted into one end side of the first housing, a tubular guide member provided in at least the second housing, a third housing which is provided in the second housing on a side opposite to the first housing and is provided so as to protrude and retract relative to the second housing, a motor which is accommodated in the first housing and has a rotation shaft, a drive shaft which is provided at least in the third housing, is rotatably driven by receiving a rotational force of the rotation shaft of the motor, and applies power to the third housing, a bearing holder which is provided in the first housing and supports a bearing for rotatably supporting at least one of the rotation shaft and the drive shaft, a housing side clamping portion provided in the second housing, a guide side clamping portion which is provided in the guide member and is disposed at a position that overlaps the housing side clamping portion in an axial direction, a first seal portion which is provided between the housing side clamping portion and the guide side clamping portion, and is clamped by the housing side clamping portion and the guide side clamping portion, and a spring member which is provided between the second housing and the guide member, and presses one of the housing side clamping portion and the guide side clamping portion toward the other.

In this manner, by clamping the first seal portion by the housing side clamping portion and the guide side clamping portion and further pressing one of the housing side clamping portion and the guide side clamping portion toward the other using the spring member, the housing side clamping portion and the guide side clamping portion can be brought into close contact with the first seal portion. For this reason, even if rainwater or the like intrudes through a gap between the first housing and the second housing or a gap between the second housing and the third housing, this rainwater or the like can be blocked between the second housing and the guide member. Therefore, it is possible to firmly prevent rainwater or the like from entering the bearing holder or the bearing.

According to the second aspect of the present invention, in the actuator according to the first aspect of the present invention, the housing side clamping portion is an inner flange which is provided at an end portion of the second housing on the bearing holder side to protrude radially inward, and the guide side clamping portion is an outer flange which is provided closer to the bearing holder side than the housing side clamping portion of the guide member and protrudes radially outward.

With this configuration, the housing side clamping portion and the guide side clamping portion can be made with a simple structure, and the first seal portion can be clamped firmly by the housing side clamping portion and the guide side clamping portion. Further, either one of the housing side clamping portion and the guide side clamping portion can be reliably pressed toward the other using the spring member.

According to the third aspect of the present invention, in the actuator according to the second aspect of the present invention, the guide side clamping portion abuts the bearing holder.

With this configuration, even when a pressing force is applied by the spring member on the guide side clamping portion, the movement of the guide side clamping portion can be restricted by the bearing holder. For this reason, for example, it is unnecessary to additionally consider a structure that can restrict the movement of the guide side clamping portion, and it is possible to bring the housing side clamping portion and the guide side clamping portion into close contact with the first seal portion by maximally and effectively utilizing the spring force of the spring member.

According to the fourth aspect of the present invention, in the actuator according to any one aspect of the first to third aspects of the present invention, the third housing is fitted into the second housing, and the second seal portion for securing a sealing property between the third housing and the second housing is provided in a region where the third housing and the second housing overlap each other while the third housing reaches a protruded state from a retracted state relative to the second housing.

With this configuration, the sealing property between the second housing and the third housing using the second seal portion can be reliably secured. For this reason, it is possible to reliably prevent rainwater or the like from entering through a gap between the second housing and the third housing.

According to the fifth aspect of the present invention, in the actuator according to any one aspect of the first to fourth aspects of the present invention, a third seal portion is provided between the bearing and at least any one of the rotation shaft and the drive shaft for securing a sealing property between the bearing and at least any one of the rotation shaft and the drive shaft.

With this configuration, the sealing property between at least any one of the rotation shaft and the drive shaft and the bearing can be reliably secured. Therefore, it is possible to prevent rainwater or the like from entering between the rotation shaft or the drive shaft and the bearing.

According to the sixth aspect of the present invention, in the actuator according to any one aspect of the first to fifth aspects of the present invention, a fourth seal portion is provided between the bearing and the bearing holder to secure a sealing property between the bearing and the bearing holder.

With this configuration, the sealing property between the bearing and the bearing holder can be surely secured. For this reason, it is possible to reliably prevent rainwater or the like from entering between the bearing and the bearing holder.

According to the seventh aspect of the present invention, a vehicle door opening and closing actuator uses the actuator described above to open and close a door provided in an openable and closable manner with respect to an opening portion.

With this configuration, it is possible to prevent entry of rainwater or the like into the inside, and in particular, it is possible to provide a vehicle door opening and closing actuator that can reliably prevent rainwater or the like from entering a bearing holder or a bearing.

Advantageous Effects of Invention

According to the present invention, the first seal portion is clamped by the housing side clamping portion and the guide side clamping portion, and further, either one of the housing side clamping portion and the guide side clamping portion is pressed toward the other by the spring member. Thus, the housing side clamping portion and the guide side clamping portion can be brought into close contact with the first seal portion. For this reason, even if rainwater or the like intrudes through a gap between the first housing and the second housing or a gap between the second housing and the third housing, this rainwater or the like can be blocked between the second housing and the guide member. Therefore, it is possible to reliably prevent rainwater or the like from entering the bearing holder or the bearing.

DESCRIPTION OF EMBODIMENTS

Next, an embodiment of the present invention will be described with reference to the drawings.

(Vehicle Door Opening and Closing Actuator)

Figure 1:
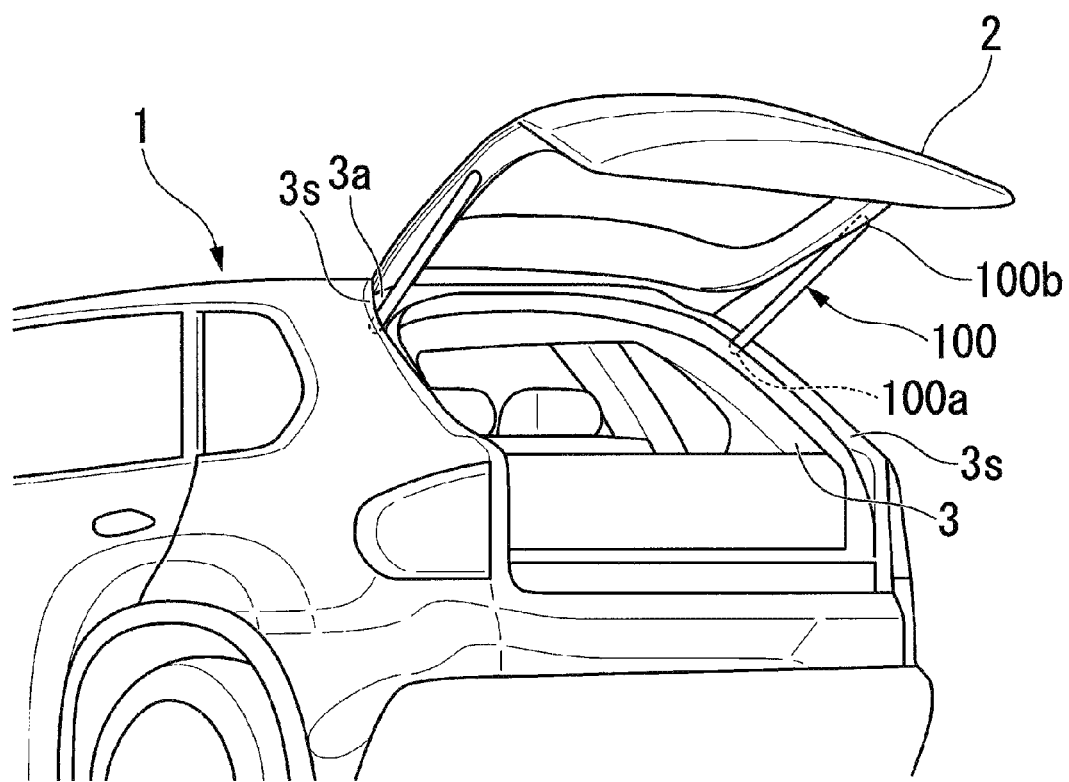
FIG. 1 is a perspective view showing an example of a vehicle having a vehicle door opening and closing actuator according to an embodiment of the present invention.

FIG. 1 is a perspective view showing an example of a vehicle including a vehicle door opening and closing actuator 100 (hereinafter, simply referred to as an actuator 100) according to an embodiment of the present invention.

As shown in FIG. 1, the actuator 100 opens and closes, for example, a tail gate (door) 2 of a car 1. The tailgate 2 is provided at an upper portion 3a of an opening portion 3 through a hinge mechanism (not shown) in an openable and closable manner with respect to the opening portion 3 formed in a rear portion of a car body of the car 1.

The actuators 100 are respectively provided on both left and right sides of the opening portion 3. In addition, one end 100a of the actuator 100 is rotatably connected to an outer frame portion 3s of the opening portion 3 via a ball stud (not shown). Also, the other end 100b of the actuator 100 is rotatably connected to the tail gate 2 via a ball stud (not shown).

Further, in the following description, the opening portion 3 side of the actuator 100 may be referred to as one end side or one side, and the tailgate 2 side may be referred to as the other end side or the other side.

Figure 2:
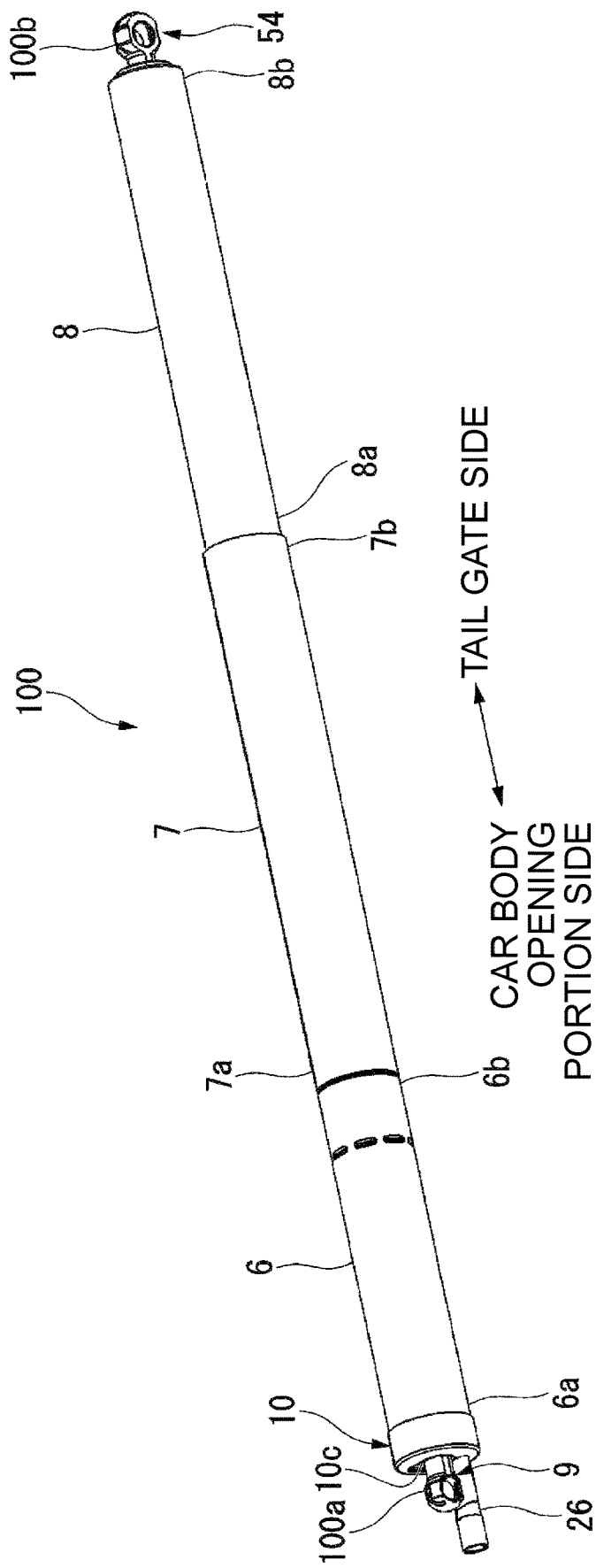
FIG. 2 is a perspective view of the vehicle door opening and closing actuator according to the embodiment of the present invention.
Figure 3:
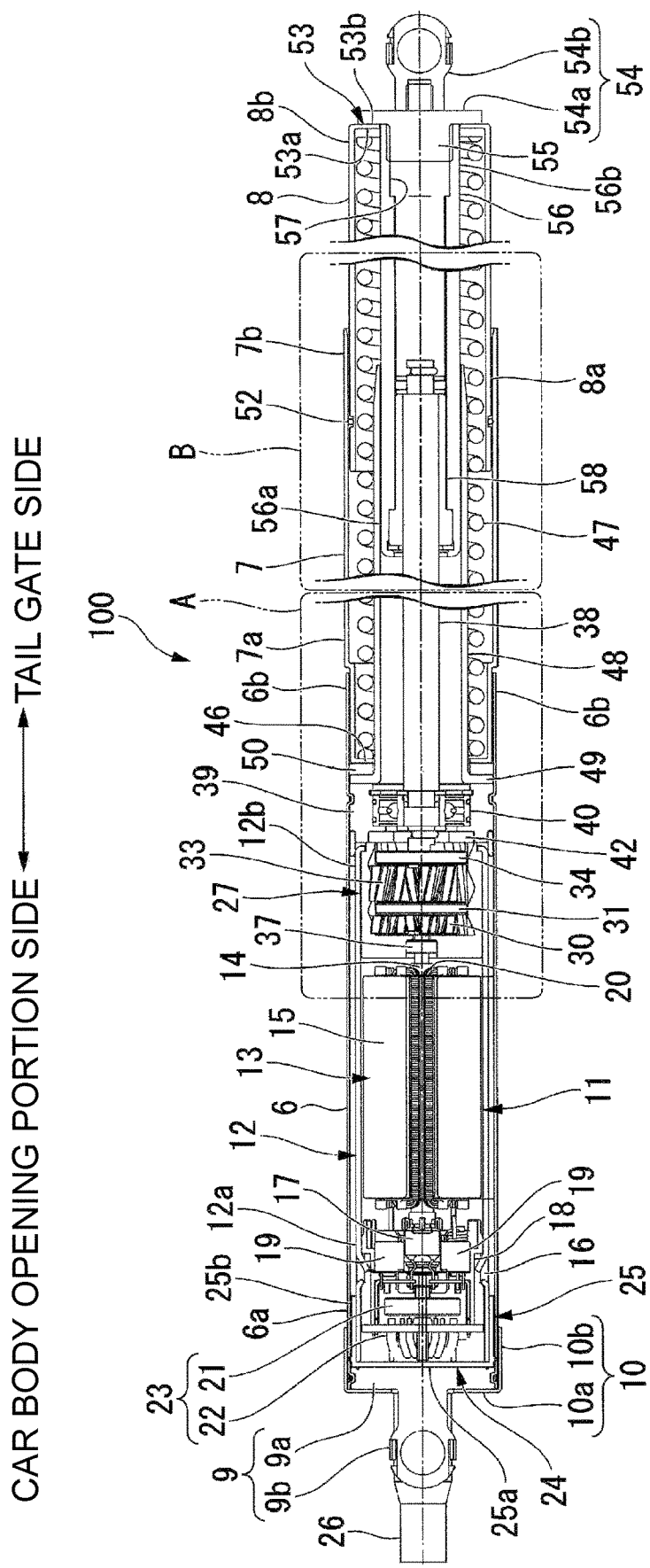
FIG. 3 is a cross-sectional view of the actuator according to the embodiment of the present invention.

FIG. 2 is a perspective view of the actuator 100. FIG. 3 is a cross-sectional view of the actuator 100.

As shown in FIGS. 2 and 3, the actuator 100 is in the form of a rod including three housings 6 to 8, i.e., a first housing 6 that is substantially cylindrical, a second housing 7 that is substantially cylindrical and has one end 7a (the left side end in FIGS. 2 and 3) fitted into the other end 6b of the first housing 6 (the right side end in FIGS. 2 and 3), and a third housing 8 that is substantially cylindrical and is provided at the other end 7b of the second housing 7 in an protrudable and retractable manner.

In addition, in the following description, a direction along a central axis of each of the housings 6 to 8 will simply be referred to as an axial direction, a radial direction of each of the housings 6 to 8 will simply be referred to as a radial direction, and a direction along an outer circumferential surface of each of the housings 6 to 8 will simply be referred to as a circumferential direction.

(First Housing)

The first housing 6 is made of a metal material such as iron. A joint unit 9, which is connected to the ball stud (not shown) provided in the outer frame portion 3*s* (see FIG. 1) of the opening portion 3, is provided at one end 6*a* of the first housing 6. The joint unit 9 is integrally formed by a plate portion 9*a* that is substantially circular and fitted into the one end 6*a* of the first housing 6 and a socket portion 9*b* protruding from the plate portion 9*a* toward one side (outward) in the axial direction of the first housing 6. An insertion hole (not shown) through which a harness cover 26 which will be described later can be inserted is formed in the plate portion 9*a*.

Also, a cap 10 with a bottom, which is substantially cylindrical, is mounted on the one end 6*a* of the first housing 6. The cap 10 is integrally formed by a closure portion 10*a* for closing an opening of the one end 6*a* of the first housing 6 and a cylindrical portion 10*b* which is continuous from an outer circumferential portion of the closure portion 10*a* in a cylindrical shape and extends toward the first housing 6 side in a curved manner. The cylindrical portion 10*b* is externally fitted (pressed) and fixed onto the one end 6*a* of the first housing 6. In addition, an opening portion 10*c* through which the socket portion 9*b* of the joint unit 9 and the harness cover 26 which will be described later can be inserted is formed in a large part at a substantially radial center of the closure portion 10*a*.

(Motor Part)

A motor part 11 is accommodated in the first housing 6. The motor part 11 includes a yoke 12 that is substantially cylindrical, a magnet (not shown) fixed to an inner circumferential surface of the yoke 12, an armature 13 which is rotatably provided on an inner side of the yoke 12 in the radial direction, and a brush holder unit 16 which supplies power to the armature 13. The yoke 12 is made of a conductive metal. An outer diameter of the yoke 12 is set to be smaller by a predetermined dimension than an inner diameter of the first housing 6.

The armature 13 provided on the inner side of the yoke 12 in the radial direction includes a shaft 14 provided to be rotatable in the yoke 12, an armature core 15 which is externally fitted and fixed to the shaft 14 and is made of a magnetic material, a coil 20 wound around the armature core 15, and commutator 17 which is adjacent to the armature core 15, externally fitted and fixed to the shaft 14 and to which an end portion of the coil 20 is connected.

The shaft 14 extends in the axial direction at a radial center of the yoke 12. The shaft 14 has one end inserted into the brush holder unit 16 and is rotatably supported by the brush holder unit 16, and the other end thereof is connected to a reduction gear unit 27 which will be described later. In addition, a sensor magnet 21 is attached to one end of the shaft 14. The sensor magnet 21 constitutes one portion of a rotational position detection device 23 for detecting a rotational position of the shaft 14.

The brush holder unit 16 for supplying power to the armature 13 includes a resin brush holder 18 fixed by caulking to one end 12*a* of the yoke 12 and a brush 19 held by the brush holder 18. This brush 19 is in sliding contact with the commutator 17. Further, the brush 19 is electrically connected to an external power supply (for example, a battery) via a harness (not shown). In this manner, the electric power of the external power supply is supplied to the coil 20 via the brush 19 and the commutator 17.

Further, a sensor substrate 22 is provided on the brush holder 18 to face the sensor magnet 21 provided on the shaft 14 in the axial direction. The sensor substrate 22 constitutes the other portion of the rotational position detection device 23. A magnetic detection element (not shown) is mounted on the sensor substrate 22 to face the sensor magnet 21 in the axial direction. A magnetic change when the sensor magnet 21 rotates is detected by the magnetic detection element. As a result, the rotational position of the shaft 14 can be detected by the rotational position detection device 23.

A seal portion 24 is mounted on the joint unit 9 side of the brush holder unit 16. The seal portion 24 is made of a rubber-based material having elasticity. The seal portion 24 has a seal main body 25 formed in a substantially cylindrical shape with a bottom to cover the brush holder unit 16 from the joint unit 9 side. That is, the seal main body 25 is configured to include a bottom portion 25*a* sandwiched between the brush holder 18 and the plate portion 9*a* of the joint unit 9, and a circumferential wall portion 25*b* which has a substantially cylindrical shape, extends from an outer circumferential edge of the bottom portion 25*a* to a side opposite to the joint unit 9 and is interposed between the brush holder unit 16 and an inner circumferential surface of the first housing 6.

The harness cover 26 is formed to protrude in one axial direction (outward) from the bottom portion 25*a* of the seal main body 25. The harness cover 26 is formed in a substantially pipe shape, and communicates with the inside and the outside of the seal main body 25. A harness (not shown) for electrically connecting an external power supply (not shown) and the brush 19 is inserted into the harness cover 26 configured as described above.

With this configuration, when the electric power of the external power supply is supplied to the coil 20 via the harness (not shown), the brush 19 and the commutator 17, a magnetic field is formed in the armature core 15. Then, the shaft 14 is driven to rotate around its central axis by the magnetic attractive force and the magnetic repulsive force generated between the magnetic field and the magnet fixed to the yoke 12. Further, the sensor magnet 21 rotates integrally with the shaft 14. The magnetic change when the sensor magnet 21 rotates is detected by the rotational position detection device 23, and the rotational position of the shaft 14 is detected.

(Reduction Gear Unit)

Figure 4:
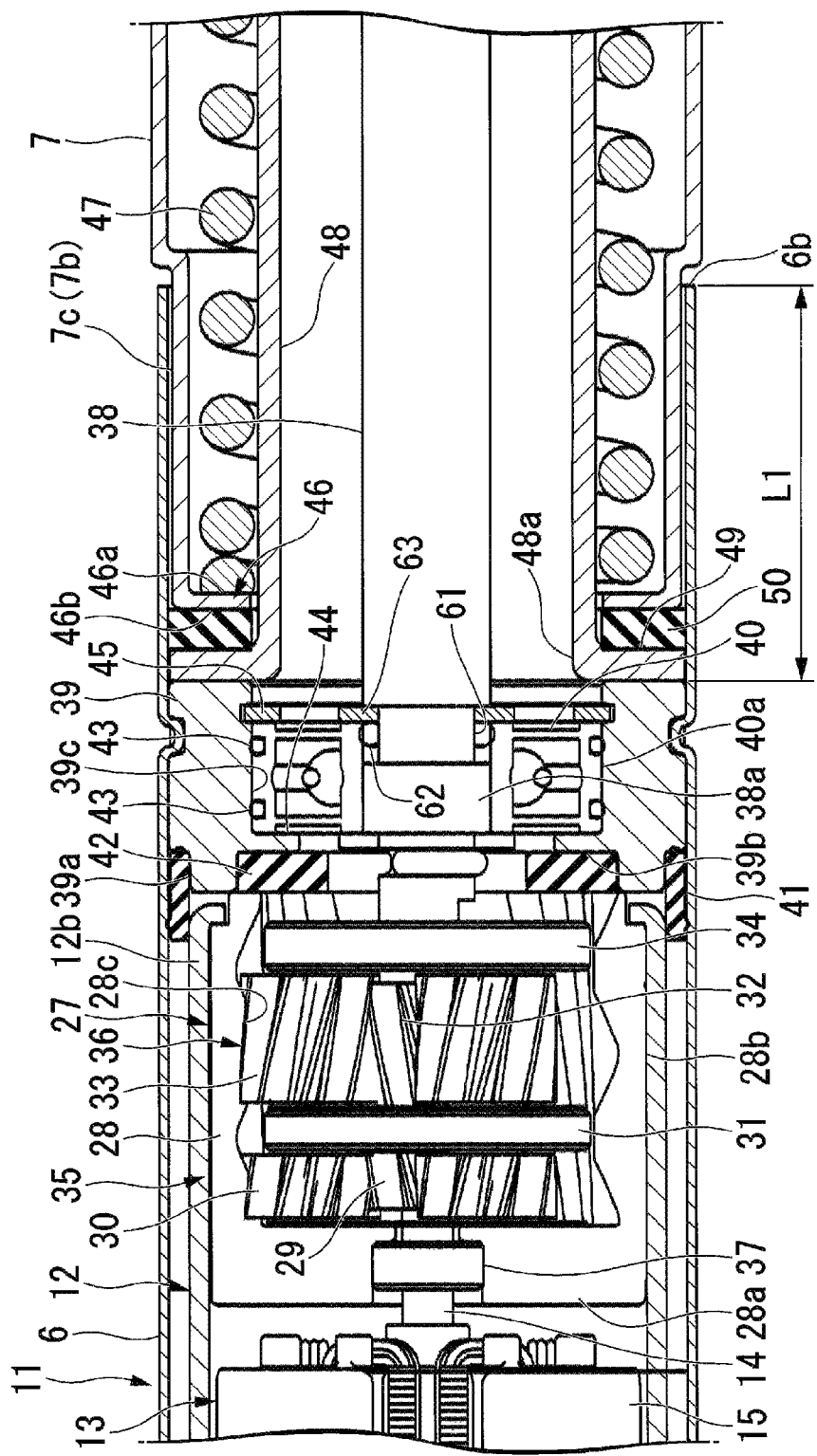
FIG. 4 is an enlarged view of the portion A shown in FIG. 3.

FIG. 4 is an enlarged view of a portion A shown in FIG. 3.

As shown in FIGS. 3 and 4, the reduction gear unit 27 connected to the other end of the shaft 14 is configured as a two stage planetary reduction mechanism, and the two stage planetary reduction mechanism has an internal gear 28 that is a substantially tubular shape with a bottom and is internally fitted and fixed to the other end 12*b* of the yoke 12, a first stage planetary gear portion 35, and a second stage planetary gear portion 36.

The first stage planetary gear portion 35 is configured to include a first sun gear 29 externally fitted and fixed to the other end of the shaft 14, a plurality of (for example, three) first planetary gears 30 engaged with the first sun gear 29 and the internal gear 28, and a first carrier 31 which rotatably supports each of the first planetary gears 30. The second stage planetary gear portion 36 is configured by a second sun gear 32 which rotates integrally with the first carrier 31, a plurality of (for example, three) second planetary gears 33 meshed with the second sun gear 32 and the internal gear 28, and a second carrier 34 which rotatably supports each of the second planetary gears 33.

The internal gear 28 is formed such that a circumferential wall portion 28b of the internal gear 28 is, for example, press-fitted into the other end 12b of the yoke 12 with a form that a bottom portion 28a side faces the armature 13 side. In addition, a teeth portion 28c meshable with the first planetary gears 30 and the second planetary gears 33 is formed on an inner circumferential surface of the circumferential wall portion 28b. Further, a bearing 37 for rotatably supporting the other end side of the shaft 14 at the substantially center in the radial direction is provided on the bottom portion 28a of the internal gear 28.

Also, the internal gear 28, the first sun gear 29, the first planetary gears 30, the second sun gear 32, and the second planetary gears 33 are each a helical gear. As a result, the meshing allowance between respective gears in the reduction gear unit 27 is increased, thereby reducing operating noise.

In this reduction gear unit 27, when the shaft 14 rotates, the first sun gear 29 rotates integrally with the shaft 14. The rotation of the first sun gear 29 is transmitted to the first planetary gears 30 on an outer circumferential side of the first sun gear 29. Each first planetary gear 30 revolves around an outer circumferential portion of the first sun gear 29 while being meshed with the first sun gear 29 and the internal gear 28, and at the same time rotates about its own rotation axis, that is, performs so-called planetary motion. Due to the planetary motion of the plurality of first planetary gears 30, the first carrier 31 rotates coaxially with the shaft 14 in a decelerated manner.

When the first carrier 31 rotates, the second sun gear 32 integrally rotates and the rotation of the second sun gear 32 is transmitted to the second planetary gears 33 on an outer circumferential side of the second sun gear 32. Each second planetary gear 33 revolves around an outer circumferential portion of the second sun gear 32 while being meshed with the second sun gear 32 and the internal gear 28, and at the same time rotates about its own rotation axis, that is; performs so-called planetary motion. Due to the planetary motion of the plurality of second planetary gears 33, the second carrier 34 rotates coaxially with the shaft 14 in a decelerated manner.

One end 38a of a screw shaft 38 is connected to the second carrier 34. As a result, the rotation of the shaft 14 in the motor part 11 is transmitted to the screw shaft 38 via the reduction gear unit 27, so that the screw shaft 38 is driven to rotate around its central axis.

The one end 38a of the screw shaft 38 is rotatably supported by a bearing holder 39. In addition, the other end 6b of the first housing 6 protrudes toward the other side (the right side in FIG. 4) further than the bearing holder 39.

The bearing holder 39 is formed in a substantially annular shape, and is internally fitted to be closer to the other end side (the right side in FIGS. 3 and 4) of the first housing 6 than the reduction gear unit 27 and fixed thereto by caulking. Further, one end of the bearing holder 39 abuts the other end of the internal gear 28. A bearing 40 is inserted or pressed into an inner circumferential surface 39c of the bearing holder 39. The bearing holder 39 rotatably supports the one end 38a of the screw shaft 38 via the bearing 40.

An O-ring groove 61 is formed at a position supported by the bearing 40 of the screw shaft 38. An O-ring 62 is mounted in the O-ring groove 61. In addition, a retaining ring 63 is provided in the O-ring groove 61. As a result, the axial movement of the screw shaft 38 with respect to the bearing 40 is restricted.

Further, on the inner circumferential surface 39c of the bearing holder 39, an inner flange 44 is formed to protrude radially inward at a position close to the reduction gear unit 27. The inner flange 44 restricts the movement of the bearing 40 toward the reduction gear unit 27 side. Also, on the inner circumferential surface 39c of the bearing holder 39, a retaining ring 45 is provided at a position corresponding to a side opposite to the inner flange 44 with the bearing 40 interposed therebetween. The movement of the bearing 40 in the axial direction is restricted by the retaining ring 45 and the inner flange 44.

In addition, O-rings 43 are respectively mounted at positions corresponding to both axial sides of the bearing 40 between an outer circumferential surface 40a of the bearing 40 and the inner circumferential surface 39c of the bearing holder 39. The O-ring 43 is for securing the sealing property between the bearing holder 39 and the bearing 40.

Further, a reduced diameter portion 27a formed to have a reduced diameter by a step is formed on an outer circumferential portion of the bearing holder 39 on the reduction gear unit 27 side. A first damper portion 41, which is substantially cylindrical, is provided between the reduced diameter portion 27a and the other end 12b of the yoke 12. The first damper portion 41 is for inhibiting the vibration of the motor unit 11 and the reduction gear unit 27 from being transmitted to the first housing 6. In addition, the first damper portion 41 is for securing the sealing property between the first housing 6 and the bearing holder 39 and between the first housing 6 and the yoke 12. The first damper portion 41 is formed of an elastic rubber material.

Here, the contact between the first housing 6 and the motor part 11 is avoided by the first damper portion 41 and the circumferential wall portion 25b of the seal portion 24 provided on one end side (the left end side in FIG. 3) of the motor part 11. That is, the motor part 11 is in a state of being floatingly supported in the first housing 6 by the first damper portion 41 and the seal portion 24.

In addition, on an end face of the bearing holder 39 on the reduction gear unit 27 side, a recessed portion 39b is formed in a large part at the radial center thereof. A second damper portion 42 which is substantially annular and formed of an elastic rubber material is provided in the recessed portion 39b. The second damper portion 42 is for inhibiting the vibration of the reduction gear unit 27 from being transmitted to the bearing holder 39 and securing the sealing property between the reduction gear unit 27 and the bearing holder 39. The one end 38a of the screw shaft 38 is inserted in the radial center of the second damper portion 42.

The screw shaft 38 extends to protrude from the bearing holder 39 toward the other side in the axial direction. The screw shaft 38 is a so-called trapezoidal screw, and screw threads are formed on an outer circumferential surface thereof. The second housing 7 is provided to cover the circumference of the screw shaft 38 configured as described above.

(Second Housing)

The second housing 7 is made of a resin material or the like. An outer diameter of the second housing 7 is set to be substantially the same as an outer diameter of the first housing 6 except for the one end 7a side fitted into the other end 6b of the first housing 6. On the other hand, the one end 7a side of the second housing 7 is reduced in diameter by a step to be a reduced diameter portion 7c. The reduced diameter portion 7c is inserted into the other end 6b of the first housing 6. As a result, the outer circumferential surface of the first housing 6 and the outer circumferential surface of the second housing 7 are substantially flush with each other.

In addition, the second housing 7 is formed such that the other end 7b of the second housing 7 slightly protrudes more than a tip end of the screw shaft 38 in a state that the one end 7a side of the second housing 7 is fitted into the other end 6b of the first housing 6. On an inner circumferential edge of the other end 7b of the second housing 7, a slightly chamfered portion 7d is formed such that an opening area thereof gradually increases toward the other end in the axial direction (see FIG. 5).

Furthermore, a length of the reduced diameter portion 7c of the second housing 7 is set to be shorter than a length L1 from the bearing holder 39 accommodated in the first housing 6 to the other end 6b of the first housing 6. For this reason, in a state in which the reduced diameter portion 7c of the second housing 7 is fitted into the other end 6b of the first housing 6, the one end 7a of the second housing 7 does not abut the bearing holder 39.

Also, an inner flange 46 formed to be bent inward in the radial direction is formed at the one end 7a of the second housing 7. The inner flange 46 functions as a spring abutting surface 46a which abuts one end of a coil spring 47 that will be described later, and a surface on a side opposite to the spring abutting surface 46a (the surface on the bearing holder 39 side) functions as a housing side clamping surface 46b that clamps a seal portion 50.

The coil spring 47 formed in a spiral shape along the inner circumferential surface of the second housing 7 is provided in the second housing 7. One end of the coil spring 47 abuts the inner flange 46 (the spring abutting surface 46a) of the second housing 7. In addition, a free length of the coil spring 47 is set to be sufficiently longer than a length of the second housing 7. Therefore, the other end of the coil spring 47 protrudes from the other end 7b of the second housing 7 in a state that the one end of the coil spring 47 abuts the inner flange 46 of the second housing 7.

(Guide Tube)

Also, in the second housing 7, a guide tube 48, which is substantially cylindrical, is accommodated further inward in the radial direction than the coil spring 47. The guide tube 48 guides the movement of an inner tube 56, which will be described later, and inhibits the coil spring 47 from flexing or buckling to a side in an expansion and contraction direction when the coil spring 47 expands and contracts. In addition, an outer flange 49 is formed to protrude radially outwardly from one end 48a of the guide tube 48. The outer flange 49 is disposed at a position overlapping the inner flange 46 of the second housing 7 in the axial direction. Further, the outer flange 49 abuts the bearing holder 39. As a result, the movement of the guide tube 48 toward the motor unit 11 side is restricted.

The guide tube 48 is formed such that a distal end of the screw shaft 38 and the other end 48b of the guide tube 48 are substantially aligned in the radial direction in a state that the outer flange 49 abuts the bearing holder 39. On an outer circumferential edge of the other end 48b of the guide tube 48, a slightly chamfered portion 48c is formed to be tapered toward the other end in the axial direction (see FIG. 5).

(Seal Portion)

Since the outer flange 49 of the guide tube 48 abuts the bearing holder 39, a gap is formed in the axial direction between the outer flange 49 and the inner flange 46 of the second housing 7. The seal portion 50 is a substantially annular shape and is disposed in this gap. The seal portion 50 is for securing the sealing property between the second housing 7 and the guide tube 48, and is made of a material having waterproofness and elasticity such as a rubber-based material.

An outer diameter of the seal portion 50 is set to be substantially equal to the inner diameter of the first housing 6, and its outer peripheral surface is in close contact with the inner circumferential surface of the first housing 6. A thickness of the seal portion 50 is set to be substantially equal to an interval between the outer flange 49 of the guide tube 48 and the inner flange 46 of the second housing 7. That is, the seal portion 50 is clamped between the outer flange 49 of the guide tube 48 and the inner flange 46 (the housing side clamping surface 46b) of the second housing 7. As a result, the seal portion 50 secures the sealing property between the second housing 7 and the guide tube 48.

(Third Housing)

Figure 5:
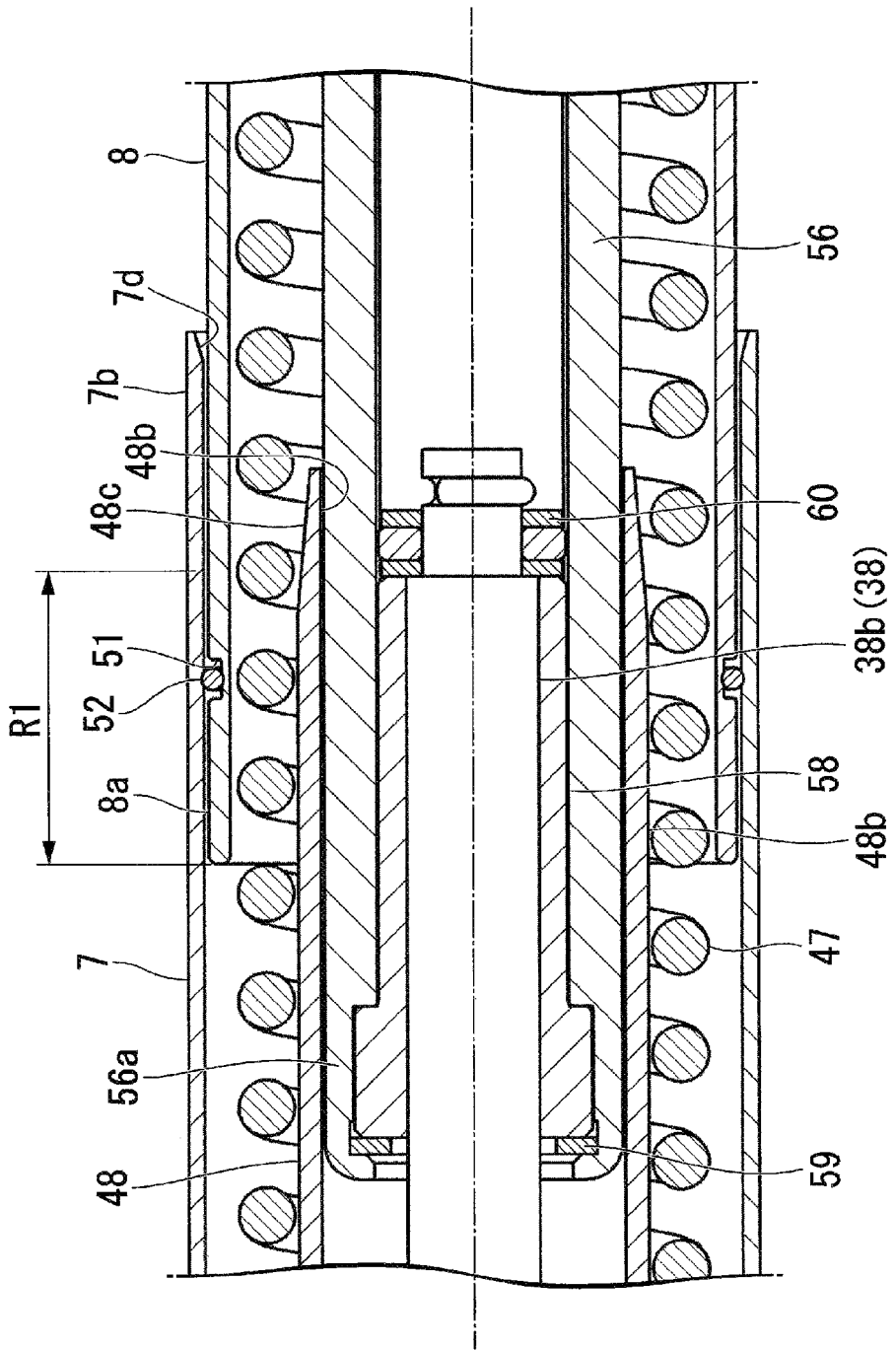
FIG. 5 is an enlarged view of the portion B shown in FIG. 3.

FIG. 5 is an enlarged view of the portion B shown in FIG. 3.

As shown in FIGS. 3 and 5, the third housing 8 which is substantially cylindrical and provided to protrude and retract from the other end 7b of the second housing 7 has an outer diameter which is set to be slightly smaller than the outer diameter of the second housing 7. As a result, the third housing 8 can protrude and retract from the other end 7b of the second housing 7. Also, the other end side of the coil spring 47 is accommodated in the third housing 8.

An O-ring groove 51 is formed in an outer circumferential surface of the third housing 8 on the one end 8a side of the third housing 8. The O-ring groove 51 is formed in a region R1 where the second housing 7 and the third housing 8 overlap each other while the third housing 8 reaches a protruded state from a retracted state relative to the second housing 7. An O-ring 52 is mounted in the O-ring groove 51 that is formed as above. As a result, the sealing property between the second housing 7 and the third housing 8 is secured.

Further, an inner flange 53 formed to be bent radially inward is formed at the other end 8b of the third housing 8. The inner flange 53 functions as a spring abutting surface 53a that abuts the other end of the coil spring 47, and a surface on a side opposite to the spring abutting surface 53a (the surface on the other end side in the axial direction) functions as a joint abutting surface 53b that abuts a joint unit 54, which will be described later.

The joint unit 54 connected to a ball stud (not shown) provided on the tailgate 2 (see FIG. 1) is provided at the other end 8b of the third housing 8. The joint unit 54 is integrally formed to include a plate portion 54a which is substantially disc-shaped and abuts the joint abutting surface 53b of the third housing 8, and a socket portion 54b protruding from the plate portion 54a toward the other side (outward) in the axial direction are.

An outer diameter of the plate portion 54a is set to be slightly smaller than an outer diameter of the third housing 8. A male screw portion 55 protruding into the third housing 8 via the inner flange 53 of the third housing 8 is integrally formed at a substantially radial center of the plate portion 54a. The other end 56b of the inner tube 56 which is substantially cylindrical and accommodated in the third housing 8 is screwed with the male screw portion 55.

(Inner Tube)

The inner tube 56 is formed, for example, by drawing aluminum and is accommodated further radially inward than the coil spring 47 in the third housing 8. In addition, an outer diameter of the inner tube 56 is set to be slightly smaller than an inner diameter of the guide tube 48. Also, one end 56*a* of the inner tube 56 is slidably inserted into the other end 48*b* of the guide tube 48.

Further, a nut member 58 is internally fitted and fixed to the one end 56*a* of the inner tube 56. The nut member 58 is integrally fixed to the inner tube 56 by caulking an end portion of the inner tube 56 on the motor part 11 side toward the inner diameter side. Therefore, the circumferential rotation of the nut member 58 with respect to the inner tube 56 is restricted.

The other end 38*b* of the screw shaft 38 is screwed with this nut member 58. A stopper 60 for preventing disengagement of the nut member 58 from the screw shaft 38 is provided at the other end 38*b* of the screw shaft 38.

On the other hand, a female screw portion 57 screwed with the male screw portion 55 of the joint unit 54 is engraved at the other end 56*b* side of the inner tube 56 on a side opposite to the motor part 11. As a result, the inner tube 56 is integrated with the joint unit 54. Since the joint unit 54 is connected to a ball stud (not shown) provided on the tailgate 2, the joint unit 54 is prevented from rotating together with the screw shaft 38. For this reason, when the screw shaft 38 is rotated, the nut member 58 moves along the screw shaft 38.

Here, the length of the third housing 8 is set to such a length that the coil spring 47 is slightly compressed by the inner flange 53 (the spring abutting surface 53*a*) in a state where the nut member 58 is positioned at a position that is almost the other end 38*b* side of the screw shaft 38. That is, the coil spring 47 constantly urges the third housing 8 in a direction of protruding from the second housing 7.

Further, the third housing 8 is connected to the screw shaft 38 via the inner tube 56 and the nut member 58, and the movement of the third housing 8 in a direction protruding from the second housing 7 is restricted. For this reason, the coil spring 47 constantly urges the inner flange 46 of the second housing 7 toward the seal portion 50 (toward the outer flange 49 of the guide tube 48).

(Assembling Method of Vehicle Door Opening and Closing Actuator)

Next, an assembling method of the actuator 100 will be described.

First, the joint unit 9, the motor part 11 and the reduction gear unit 27 are assembled to the first housing 6. In addition, the stopper member 60 is assembled to the screw shaft 38. Further, the nut member 58 is assembled to the inner side of the inner tube 56 and is fixed by caulking. Then, the screw shaft 38 and the nut member 58 are screwed with each other.

Subsequently, the outer flange 49 of the guide tube 48 is directed to the other end 6*b* side of the first housing 6, and then the guide tube 48 is inserted into the other end 6*b* side of the first housing 6. Then, the outer flange 49 of the guide tube 48 abuts the bearing holder 39.

Subsequently, the seal portion 50 is inserted or press-fitted into the other end 6*b* side of the first housing 6, and the seal portion 50 is set on the outer flange 49.

Subsequently, the reduced diameter portion 7*c* of the second housing 7 is directed to the other end 6*b* side of the first housing 6, the reduced diameter portion 7*c* is inserted into the other end 6*b* of the first housing 6.

Subsequently, the coil spring 47 is inserted between the second housing 7 and the guide tube 48. At this time, since the chamfered portion 7*d* is formed at the other end 7*b* of the second housing 7 and the chamfered portion 48*c* is formed at the other end 48*b* of the guide tube 48, the coil spring 47 is not caught by the second housing 7 and the guide tube 48 so that the coil spring 47 can be smoothly inserted.

Subsequently, the nut member 58 previously assembled to the inner tube 56 is directed to the other end 38*b* side of the screw shaft 38, the nut member 58 is screwed with the other end 38*b* of the screw shaft 38. Then, the stopper 60 is assembled to the other end 38*b* of the screw shaft 38.

Subsequently, the one end 8*a* of the third housing 8, on which the O-ring 52 is previously mounted, is directed to the other end 7*b* side of the second housing 7, the one end 8*a* of the third housing 8 is inserted into the other end 7*b* of the second housing 7. Also, in this case, since the chamfered portion 7*d* is formed at the other end 7*b* of the second housing 7, the third housing 8 can be smoothly inserted.

Subsequently, the male screw portion 55 of the joint unit 54 is screwed with the female screw portion 57 of the inner tube 56. As a result, the assembly of the actuator 100 is completed in a state that the coil spring 47 slightly compressed.

Here, the inner flange 46 of the second housing 7 is pressed toward the seal portion 50 by the coil spring 47. On the other hand, since the outer flange 49 of the guide tube 48 clamping the seal portion 50 in cooperation with the inner flange 46 abuts the bearing holder 39, the movement thereof toward a side opposite to the seal portion 50 is restricted. For this reason, the inner flange 46 of the second housing 7 and the outer flange 49 of the guide tube 48 are firmly brought into close contact with the seal portion 50.

Also, the first damper portion 41 is provided in a space ranging between the reduction gear unit 27 side of the bearing holder 39 to the other end 12*b* of the yoke 12 and the first housing 6. For this reason, the vibration of the motor part 11 and the reduction gear unit 27 is inhibited from being transmitted to the first housing 6. In addition, the sealing properties between the first housing 6 and the bearing holder 39 and between the first housing 6 and the yoke 12 are secured.

Further, the second damper portion 42 is provided between the end face of the bearing holder 39 on the reduction gear unit 27 side and the reduction gear unit 27. For this reason, the vibration of the reduction gear unit 27 is inhibited from being transmitted to the bearing holder 39, and the sealing property between the reduction gear unit 27 and the bearing holder 39 is secured. Also, the first damper portion 41 and the second damper portion 42 are integrally molded.

Further, two O-rings 43 are mounted between the outer circumferential surface 40*a* of the bearing 40 and the inner circumferential surface 39*c* of the bearing holder 39. For this reason, the sealing property between the bearing holder 39 and the bearing 40 is secured.

Furthermore, the O-ring groove 61 is formed at a position which is supported by the bearing 40 of the screw shaft 38. The O-ring 62 is mounted in the O-ring groove 61. For this reason, the sealing property between the screw shaft 38 and the bearing 40 is secured.

(Operation of Vehicle Door Opening and Closing Actuator)

Next, operation of the actuator 100 will be described.

When electric power from an external power supply (not shown) is supplied to the motor part 11 to rotationally drive the shaft 14 of the motor part 11 due to the operation of the operator, the shaft 14 rotates. Further, the rotation of the shaft 14 is decelerated by the reduction gear portion 27 and is transmitted to the screw shaft 38.

When the screw shaft 38 rotates, the nut member 58 moves along the screw shaft 38. Since the nut member 58 is fixed to the inner tube 56 integrated with the third housing 8, as a result, the third housing 8 protrudes and retracts relative to the second housing 7, and the actuator 100 expands and contracts.

In addition, the O-ring 52 mounted on the one end 8a side of the third housing 8 is formed in the region R1 where the second housing 7 and the third housing 8 overlap while the third housing 8 reaches the protruded state from the retracted state relative to the second housing 7. That is, since the O-ring 52 is always interposed between the second housing 7 and the third housing 8, the sealing property between the second housing 7 and the third housing 8 can be firmly secured regardless of the expansion and contraction state of the actuator 100.

When the third housing 8 is retracted into the second housing 7, the tailgate 2 (see FIG. 1) provided in the opening portion 3 of the car 1 is closed. On the other hand, when the third housing 8 protrudes with respect to the second housing 7, the tailgate 2 provided in the opening portion 3 of the car 1 is opened. At this time, even if the operation of the motor part 11 is stopped in a state that the actuator 100 extends, the protruding state of the third housing 8 relative to the second housing 7 is maintained due to the urging force of the coil spring 47.

As described above, in the above-described embodiment, among the second housing 7 and the guide tube 48 arranged concentrically, the inner flange 46 is provided in the second housing 7 and the outer flange 49 is provided in the guide tube 48. In addition, the seal portion 50 is clamped by the flanges 46 and 49. Further, by pressing the inner flange 46 toward the outer flange 49 side with the coil spring 47, the flanges 46 and 49 are brought into close contact with the seal portion 50. For this reason, the assembly property of the actuator 100 can be improved with a simple structure, and even if rainwater or the like intrudes from a gap between the first housing 6 and the second housing 7 or a gap between the second housing 7 and the third housing 8, it is possible to block this rainwater or the like with the space (the seal portion 50) between the second housing 7 and the guide tube 48. Therefore, it is possible to firmly prevent rainwater or the like from entering the bearing holder 39 or the bearing 40.

Further, the outer flange 49 of the guide tube 48 abuts the bearing holder 39, and the movement of the guide tube 48 toward a side opposite to the seal portion 50 (the inner flange 46) is restricted. For this reason, even when a pressing force due to the coil spring 47 is applied to the inner flange 46, the movement of the guide tube 48 can be restricted by the bearing holder 39. Therefore, for example, it is unnecessary to additionally consider a structure that can restrict the movement of the guide tube 48 (the outer flange 49), and it is possible to bring the flanges 46 and 49 into close contact with the seal portion 50 by maximally and effectively utilizing the spring force of the coil spring 47.

Furthermore, the O-ring 52 mounted on the one end 8a side of the third housing 8 is formed in the region R1 where the second housing 7 and the third housing 8 overlap each other while the third housing 8 reaches the protruded state from the retracted state with respect to the second housing 7. That is, since the O-ring 52 is always interposed between the second housing 7 and the third housing 8, the sealing property between the second housing 7 and the third housing 8 can be firmly secured regardless of the expansion and contraction state of the actuator 100. For this reason, it is possible to firmly prevent rainwater or the like from entering through a gap between the second housing and the third housing.

Also, the first damper portion 41 is provided in a space ranging between the reduction gear unit 27 side of the bearing holder 39 to the other end 12b of the yoke 12 and the first housing 6. For this reason, the vibration of the motor unit 11 and the reduction gear unit 27 is inhibited from being transmitted to the first housing 6. In addition, the sealing properties between the first housing 6 and the bearing holder 39 and between the first housing 6 and the yoke 12 are secured. Therefore, it is possible to firmly prevent rainwater or the like from entering the motor part 11 side along the inner circumferential surface of the first housing 6.

In addition, the second damper portion 42 is provided between the end face of the bearing holder 39 on the reduction gear unit 27 side and the reduction gear unit 27. For this reason, the vibration of the reduction gear unit 27 is inhibited from being transmitted to the bearing holder 39, and the sealing property between the reduction gear unit 27 and the bearing holder 39 is secured. Therefore, it is possible to prevent rainwater or the like from entering between the reduction gear unit 27 and the bearing holder 39, thereby preventing a malfunction in the operation of the reduction gear unit 27.

Further, two O-rings 43 are mounted between the outer circumferential surface 40a of the bearing 40 and the inner circumferential surface 39c of the bearing holder 39. For this reason, the sealing property between the bearing holder 39 and the bearing 40 is secured. Therefore, it is possible to prevent rainwater or the like from entering between the bearing holder 39 and the bearing 40 and causing a failure in the operation of the bearing 40.

Moreover, the O-ring groove 61 is formed at a position which is supported by the bearing 40 of the screw shaft 38. The O-ring 62 is mounted in the O-ring groove 61. For this reason, the sealing property between the screw shaft 38 and the bearing 40 is secured. Therefore, it is possible to prevent rainwater or the like from entering between the screw shaft 38 and the bearing 40 to be transferred to the reduction gear portion 27, or to cause a malfunction in the operation of the bearing 40.

Also, it should be noted that the present invention is not limited to the above-described embodiment, and includes various modifications to the above-described embodiment within the scope not deviating from the gist of the present invention.

For example, in the above embodiment, the case that the actuator 100 is the vehicle door opening and closing actuator 100 that opens and closes, for example, the tailgate 2 of the car 1 has been described. However, the present invention is not limited to this, and it is possible to adopt the actuator 100 in various devices.

Also, in the above embodiments, the case that the one end 100a (the first housing 6 side) of the actuator 100 is rotatably connected to the outer frame portion 3s of the opening portion 3 via a ball stud (not shown) has been described. Further, in the actuator 100, the case that the other end 100b (the third housing 8 side) of the actuator 100 is rotatably connected to the tailgate 2 via a ball stud (not shown) has been described. However, the present invention is not limited thereto, and the other end 100b of the actuator 100 may be connected to the outer frame portion 3s of the opening portion 3, and the one end 100a of the actuator 100 may be connected to the tailgate 2.

Also, in the above embodiment, the case that the inner flange 46 is formed at the one end 7a of the second housing 7 and the outer flange 49 is formed at the one end 48a of the guide tube 48 has been described. However, the flanges 46 and 49 do not have to be formed at the one end 7a of the second housing 7 and the one end 48a of the guide tube 48, respectively. The positions at which the flanges 46 and 49 are formed may be between the second housing 7 and the guide tube 48. Further, the shape of each of the flanges 46 and 49 is not limited, and any structure may be used as long as it is capable of clamping the seal portion 50 in the axial direction.

Also, in the above embodiment, the case that the O-rings 43, 52, 62, etc. are used to secure the sealing property of each part has been described. Further, the case that the seal portion 50 clamped by the flanges 46 and 49 is formed in a substantially annular shape has been described. However, the present invention is not limited to this. Instead of the O-rings 43, 52 and 62 and the substantially annular seal portion 50, one which can secure the sealing property may be adopted. For example, it is also possible to use packing or the like.

Also, in the above embodiment, the case that the coil spring 47 is provided as a spring member that presses the inner flange 46 of the second housing 7 toward the seal portion 50 (toward the outer flange 49) has been described. However, the present invention is not limited to this, and a spring member capable of pressing one of the inner flange 46 and the outer flange 49 toward the other may be provided.

Also, in the above embodiment, the case that the rotational force of the shaft 14 of the motor unit 11 is transmitted to the screw shaft 38 via the reduction gear unit 27 has been described. However, the present invention is not limited to this, and the screw shaft 38 may be directly connected to the shaft 14. In this case, the screw shaft 38 may be rotatably supported by the bearing 40 provided in the bearing holder 39, or the shaft 14 may be rotatably supported. In the case that the shaft 14 is rotatably supported by the bearing 40, the O-ring 62 is mounted on a position of the shaft 14 which is supported by the bearing 40.

Also, the reduction gear unit 27 is not limited to the two-stage planetary reduction mechanism, and various reduction mechanisms can be adopted.

According to the actuator described above, by clamping the first seal portion by the housing side clamping portion and the guide side clamping portion and further pressing one of the housing side clamping portion and the guide side clamping portion toward the other using the spring member, the housing side clamping portion and the guide side clamping portion can be brought into close contact with the first seal portion. For this reason, even if rainwater or the like intrudes through a gap between the first housing and the second housing or a gap between the second housing and the third housing, this rainwater or the like can be blocked between the second housing and the guide member. Therefore, it is possible to reliably prevent rainwater or the like from entering the bearing holder or the bearing.

What is claimed is:

1. An actuator comprising:
   a first housing that is cylindrical;
   a second housing that is cylindrical and fitted into one end side of the first housing;
   a guide member that is cylindrical and provided in at least the second housing;
   a third housing that is cylindrical and provided in the second housing on a side opposite to the first housing and is provided so as to protrude and retract relative to the second housing;
   a motor part that is accommodated in the first housing and has a rotation shaft;
   a drive shaft that is provided at least in the third housing, is rotatably driven by receiving a rotational force of the rotation shaft of the motor, and applies power to the third housing;
   a bearing holder that is provided in the first housing and supports a bearing for rotatably supporting at least one of the rotation shaft and the drive shaft;
   a housing side clamping portion provided in the second housing;
   a guide side clamping portion that is provided in the guide member and is disposed at a position that overlaps the housing side clamping portion in an axial direction;
   a first seal portion that is provided between the housing side clamping portion and the guide side clamping portion, and is clamped by the housing side clamping portion and the guide side clamping portion; and
   a spring member that is provided between the second housing and the guide member, and presses one of the housing side clamping portion and the guide side clamping portion toward the other.

2. The actuator according to claim 1, wherein the housing side clamping portion is an inner flange which is provided at an end portion of the second housing on the bearing holder side to protrude radially inward, and
   the guide side clamping portion is an outer flange which is provided closer to the bearing holder side than the housing side clamping portion of the guide member and protrudes radially outward.

3. The actuator according to claim 2, wherein the guide side clamping portion abuts the bearing holder.

4. The actuator according to claim 1, wherein the third housing is fitted into the second housing, and
   the second seal portion for securing a sealing property between the third housing and the second housing is provided in a region where the third housing and the second housing overlap each other while the third housing reaches a protruded state from a retracted state relative to the second housing.

5. The actuator according to claim 1, wherein a third seal portion is provided between the bearing and at least any one of the rotation shaft and the drive shaft for securing a sealing property between the bearing and at least any one of the rotation shaft and the drive shaft.

6. The actuator according to claim 1, wherein a fourth seal portion is provided between the bearing and the bearing holder to secure a sealing property between the bearing and the bearing holder.

7. A vehicle door opening and closing actuator, having an actuator for opening and closing a door provided in an openable and closable manner with respect to an opening portion of a vehicle, the vehicle door opening and closing actuator comprising:
   a first housing that is cylindrical;
   a second housing that is cylindrical and fitted into one end side of the first housing;
   a guide member that is cylindrical and provided in at least the second housing;
   a third housing that is cylindrical and provided in the second housing on a side opposite to the first housing and is provided so as to protrude and retract relative to the second housing;
   a motor part that is accommodated in the first housing and has a rotation shaft;
   a drive shaft that is provided at least in the third housing, is rotatably driven by receiving a rotational force of the rotation shaft of the motor, and applies power to the third housing;
   a bearing holder that is provided in the first housing and supports a bearing for rotatably supporting at least one of the rotation shaft and the drive shaft;

a housing side clamping portion provided in the second housing;

a guide side clamping portion that is provided in the guide member and is disposed at a position that overlaps the housing side clamping portion in an axial direction;

a first seal portion that is provided between the housing side clamping portion and the guide side clamping portion, and is clamped by the housing side clamping portion and the guide side clamping portion; and a spring member that is provided between the second housing and the guide member, and presses one of the housing side clamping portion and the guide side clamping portion toward the other.

8. The vehicle door opening and closing actuator according to claim 7, wherein the housing side clamping portion is an inner flange which is provided at an end portion of the second housing on the bearing holder side to protrude radially inward, and the guide side clamping portion is an outer flange which is provided closer to the bearing holder side than the housing side clamping portion of the guide member and protrudes radially outward.

9. The vehicle door opening and closing actuator according to claim 8, wherein the guide side clamping portion abuts the bearing holder.

10. The vehicle door opening and closing actuator according to claim 7, wherein the third housing is fitted into the second housing, and the second seal portion for securing a sealing property between the third housing and the second housing is provided in a region where the third housing and the second housing overlap each other while the third housing reaches a protruded state from a retracted state relative to the second housing.

11. The vehicle door opening and closing actuator according to claim 7, wherein a third seal portion is provided between the bearing and at least any one of the rotation shaft and the drive shaft for securing a sealing property between the bearing and at least any one of the rotation shaft and the drive shaft.

12. The vehicle door opening and closing actuator according to claim 7, wherein a fourth seal portion is provided between the bearing and the bearing holder to secure a sealing property between the bearing and the bearing holder.

\* \* \* \* \*